D. G. TREMBLEY.
HOSE ATTACHMENT TO WASH-BASIN CONNECTIONS.

No. 179,975. Patented July 18, 1876.

WITNESSES:
C. Neveux
John Goethals

INVENTOR:
D. G. Trembley
BY
ATTORNEYS.

UNITED STATES PATENT OFFICE.

DANIEL G. TREMBLEY, OF BROOKLYN, NEW YORK.

IMPROVEMENT IN HOSE ATTACHMENTS TO WASH-BASIN CONNECTIONS.

Specification forming part of Letters Patent No. 179,975, dated July 18, 1876; application filed May 16, 1876.

*To all whom it may concern:*

Be it known that I, DANIEL G. TREMBLEY, of Brooklyn, Kings county, New York, have invented a new and Improved Hose Attachment to Wash-Basin Connections, of which the following is a specification:

The object of my invention is to provide a simple means for attaching fire-hose to the wash-stand pipe or faucet, so that, in case fire breaks out in a room having water from the street-main, water can be quickly applied for stopping it.

The connection is preferably made with the faucet, but it may be made with the pipe below the basin.

Figure 1:
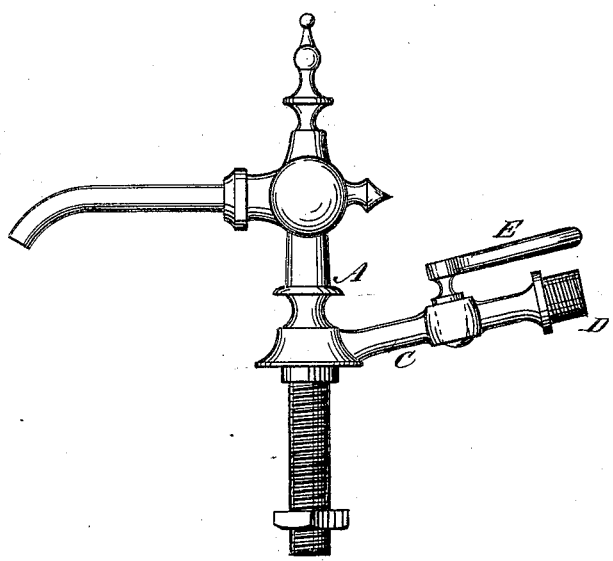
Figure 2:
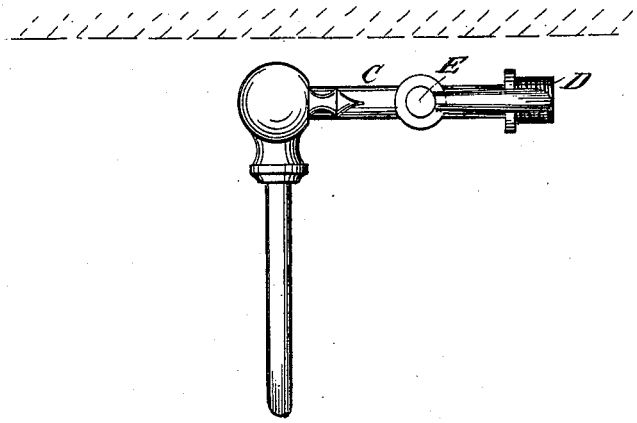

Figure 1 is a side elevation of a faucet with a hose attachment according to my invention, and Fig. 2 is a top view.

Similar letters of reference indicate corresponding parts.

A is the wash-stand faucet, which may be of any approved kind; and C is a branch pipe attached to the standing portion of the faucet, and having a screw-head, D, adapted to have a hose screwed on it, and also having a cock, E, for opening and closing the passage through it.

Thus I provide the means, in a very simple and efficient way, of attaching hose in any room having a water-faucet, for extinguishing fires when discovered before too much progress.

By this attachment fires may often be prevented which would otherwise get too strong to be extinguished by the ordinary appliances before they can be brought to bear.

The hose-connection may, as above stated, be connected to the pipe below the basin.

Having thus described my invention, I claim as new and desire to secure by Letters Patent—

A wash-basin faucet having a branch pipe, C, provided with a cock, E, and a screw-head, D, for attaching a hose, substantially as specified.

DANIEL G. TREMBLEY.

Witnesses:
    T. B. MOSHER,
    ALEX. F. ROBERTS.